Oct. 1, 1929.  E. WILDHABER  1,730,184
DIFFERENTIAL GEAR
Filed Feb. 7, 1928  2 Sheets-Sheet 1
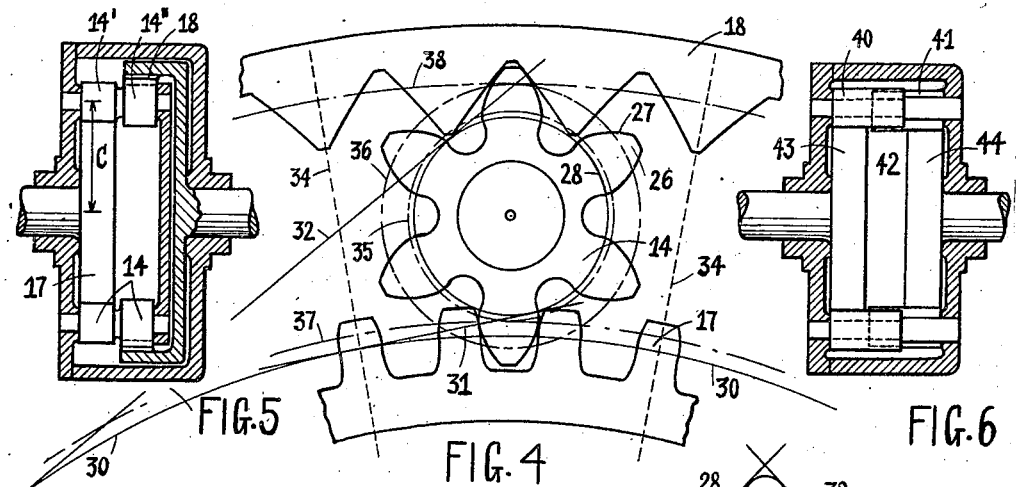
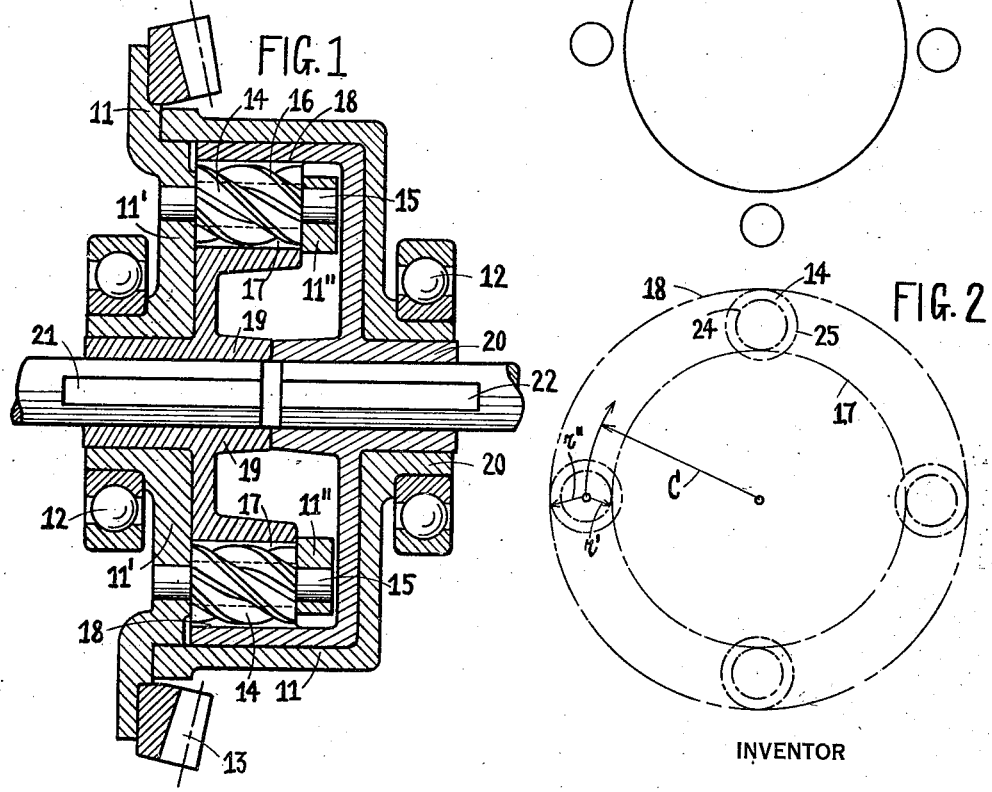
INVENTOR
Ernest Wildhaber Oct. 1, 1929.  E. WILDHABER  1,730,184
DIFFERENTIAL GEAR
Filed Feb. 7, 1928  2 Sheets-Sheet 2
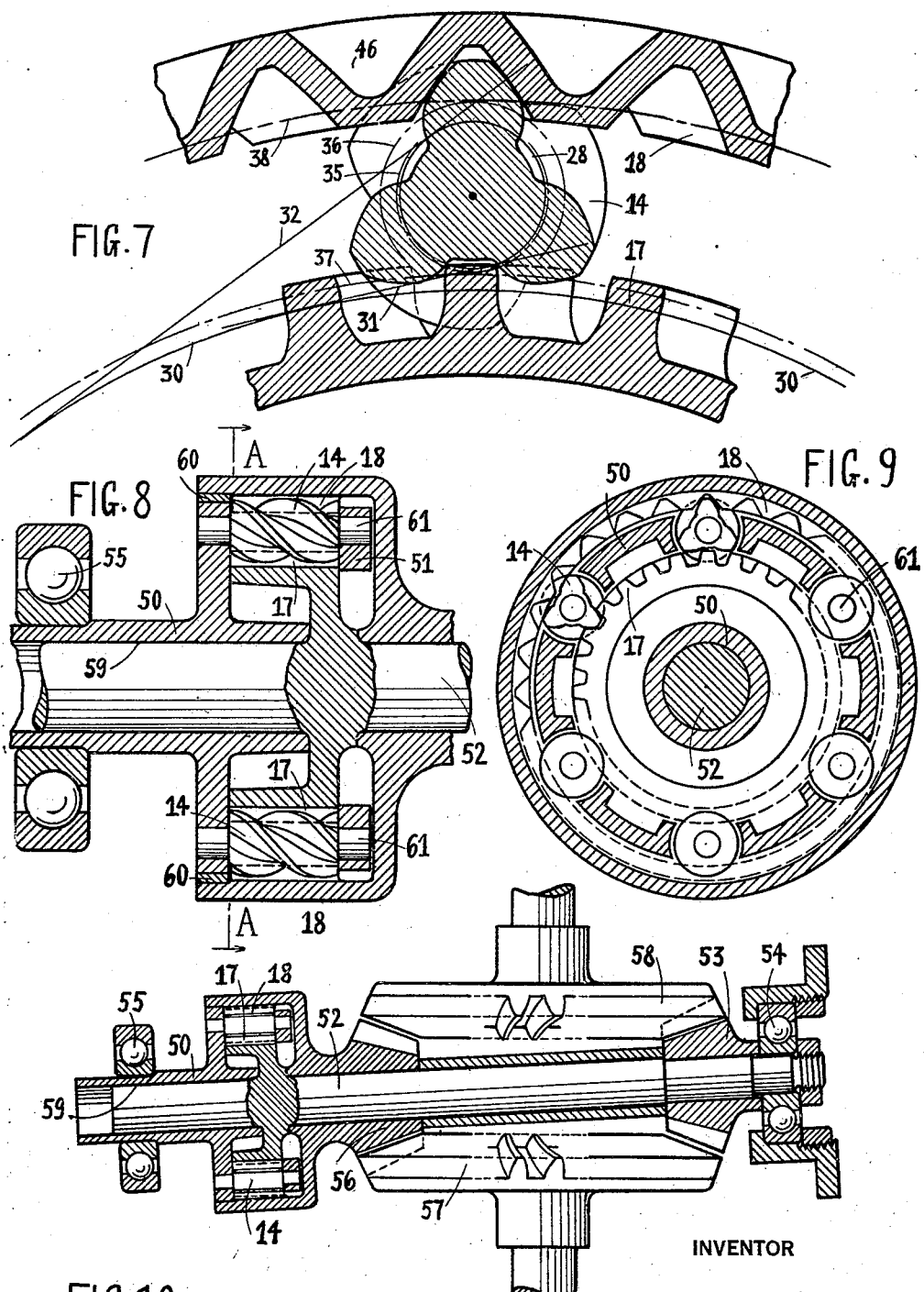
INVENTOR
Ernest Wildhaber Patented Oct. 1, 1929

1,730,184

UNITED STATES PATENT OFFICE

ERNEST WILDHABER, OF BROOKLYN, NEW YORK

DIFFERENTIAL GEAR

Application filed February 7, 1928. Serial No. 252,498.

The present invention refers to differential gears and more particularly to differential gears of the character used in automotive vehicles, for instance in the rear axles of automobiles, trucks and tractors. Differential gears of this character contain a driving member and two coaxial driven members, which may turn relatively to one another.

One object of the present invention is to provide a differential gear of simplified construction and of increased strength, which is suited to apply equal torque to its two driven elements.

Another object is to devise a differential gear of simplified structure, which is suited to impart equal torque to its two driven elements, and which consists of spur gears exclusively.

A further object is to provide a differential gear consisting of spur gears and containing a maximum number of planetary pinions.

A further aim is to provide a differential gear of very simple structure, having both driven elements extending on the same side of the differential gear, and being suited to apply equal torque to its two driven elements.

Other objects will appear in the specification and from recital of the appended claims.

Embodiments of my invention will be explained with reference to the accompanying drawings, in which—

Fig. 1 is an axial section of a differential gear constructed in accordance with my invention.

Fig. 2 is a diagram showing the pitch circles of the individual gears of the mechanism illustrated in Fig. 1, and explanatory of a principal feature of my invention.

Fig. 3 is a diagram of the base circles and lines of action of the individual gears, in case involute teeth are provided on the gears.

Fig. 4 is an enlarged view of a planetary pinion and of adjacent parts of a mating internal gear and a mating external gear, such as might be used in differential gears constructed in accordance with my invention. Fig. 4 refers particularly to gears having straight teeth.

Fig. 5 is an axial section through a differential gear of less simplified character, for comparison with the preferred forms of my invention.

Fig. 6 is an axial section through a known differential gear, shown for comparison.

Fig. 7 is a partial section taken at right angles to the axis of a differential gear constructed in accordance with my invention, and specifically illustrating the mesh and forms of teeth of a helical pinion and of adjacent parts of an internal orbit gear and an external sun gear.

Fig. 8 is an axial section through a differential gear formed in accordance with my invention and having both driven elements extending on the same side of the differential gear proper.

Fig. 9 is a section along lines A—A of Fig. 8.

Fig. 10 is a plan view, showing in a smaller scale one possible manner of connecting a differential gear, such as the gear shown in Figures 8 and 9, with the shafts of the rear wheels of a vehicle.

In Fig. 1, the numeral 11 denotes a planetary casing suitably bolted together, and journalled in two bearings 12 in known manner. Motion is imparted to casing 11 through a gear 13 which is rigidly secured to an extension of casing 11, and which meshes with a driving pinion of conventional design, not shown in the drawing. Planetary pinions 14 having integral journals 15, are rotatably secured to the part 11' of the planetary casing on one side, and on the other side to a part 11'', which is bolted to part 11' in a manner not further indicated. The pinions 14 are preferably provided with helical teeth 16, especially when their number of teeth is very small. The pinions 14 mesh on one side with an external gear 17 and on the other side with an internal gear 18. Said gears 17 and 18 contain hubs 19 and 29 respectively to which two shafts 21, 22 are secured by means of keys or splines.

Aside of the helical teeth (16), the differential gear as described so far, coincides substantially with a known form of differential gear. This known form contains however one very considerable drawback; namely it will not transmit equal torque to the two driven members 21, 22, but more torque to the shaft (22) which is connected with the internal gear (18), as will be explained presently. The pinions 14 namely exert the same tangential tooth load on the internal gear 18 and on the external gear 17, while the radius of the internal gear is increased over the radius of the external gear by an amount equal to the diameter of the pinions 14. The leverage of the tangential tooth load of the internal gear, with respect to its center, is therefore larger than the leverage of the tangential tooth load of the external gear. The torques produced on the external gear and on the internal gear are the products of the equal tangential tooth loads with their unequal leverages, and are therefore in proportion with the said leverages, that is to say with the pitch radii of the external and internal gears. Another way of expression is by stating that the torques are in proportion of the numbers of teeth of the gears 17 and 18.

If the pinions are for instance at a one to four ratio with respect to the external gear, then the pitch radius of the external gear is four times the pitch radius of the planetary pinions; and according to known structure the pitch radius of the internal gear is six times the pitch radius of the planetary pinions inasmuch as it exceeds the pitch radius of the external gear by an amount equal to the pitch diameter of the planetary pinions. The above said leverages are then at a proportion of 4 to 6, or of 1 to 1.5, which means that the torque exerted upon the internal gear is fifty percent larger than the torque exerted upon the external gear.

One main object of my invention is to remedy this condition, and to devise means for imparting equal torque to the internal gear 18 and to the external gear 17, while maintaining the simplicity of the arrangement.

According to my invention, a planetary pinion 14 rolls on the internal gear 18 with a different and larger pitch circle, 25 in Fig. 2, than pitch circle 24, with which it rolls on the external gear 17.

The action will first be described with reference to Fig. 5.

In the embodiment indicated in Fig. 5 the planetary pinions 14 consist of two parts which are integral with each other, namely of pinions 14' and of coaxial pinions 14'' of larger diameter. The smaller pinions 14' mesh with external gear 17, and the larger pinions 14'' with the internal gear 18. Drive is applied to planetary casing 11, and the pitch diameters of the pinions and gears are so determined, that equal torque is transmitted to the external gear 17 and to the internal gear 18. Equal torque is then transmitted, when the ratio between pinion 14'' and internal gear 18 is equal to the ratio between pinion 14' and external gear 17. The interrelation between the center distance C and the pitch radii $r'$ and $r''$ of the pinions 14', 14'' can then be expressed by the following formula:

$$C\left(\frac{1}{r'}-\frac{1}{r''}\right)=2,$$

as may be derived with the known methods of mathematics.

In the embodiment Fig. 1 of my invention single pinions 14 are used in place of the pinions 14', 14'' of Fig. 5, and the mesh of these single pinions with the external gear 17 and internal gear 18 corresponds to different pitch circles 24, 25 (Fig. 2), whose radii $r'$ and $r''$ are determined in accordance with the above formula. Here also the ratio between a pinion and the external gear 17 is made equal to the ratio between a pinion and the internal gear 18. Inasmuch as the same pinion 14 meshes with both gears, equal ratios mean also equal tooth numbers on the external gear 17 and on the internal gear 18.

The tooth shapes will be further explained with reference to Fig. 4, which illustrates the mesh between a straight tooth involute pinion 14 with adjacent portions of external gear 17 and internal gear 18. Any form of tooth shape may be used, the involute form being one which permits simple production. The teeth 26 of pinion 14 are provided with involute profiles 27, corresponding to base circle 28. Involute teeth on one gear (14) require also involute teeth on any mating gear 17 and 18, as is well known. Inasmuch as gears 17 and 18 have the same numbers of teeth and mesh with the same pinions, the base circles of the gears 17, 18 must be equal. The two gears contain therefore a common base circle 30. The mesh with a pinion 14 takes place along tangents to both the base circle 28 of the pinion and the base circle 30 of the gears. The mesh between the pinion and external gear 17 takes place along an inside tangent such as 31; and the mesh between the pinion and internal gear 18 along an outside tangent such as 32. This is separately illustrated in Fig. 3.

Two center lines of the individual teeth of the external and of the internal gear have been shown in dotted lines 34, to indicate that both gears are provided with the same tooth numbers. The numerals 35, 36 denote the pitch circles of different diameters, with which the pinion rolls on the corresponding pitch circles 37 and 38 of the external gear 17 and of internal gear 18 respectively. The lines of action (31, 32) intersect the corresponding pitch circles in their point of tangency, as well known, and include a certain angle with the pitch circles at said point. This angle is commonly known under the name of pressure angle. It is noted, that pinion 14 meshes with internal gear 18 with a pressure angle, which is much larger than the pressure angle between pinion 14 and external gear 17. This feature is one of the characteristics of the disposition in accordance with the present invention.

With the description furnished involute gears as indicated in Fig. 4 may be produced with known methods. One way of producing the gears which is applicable to involute teeth and to any other form of teeth, is the following:

It consists in assuming any suitable known tooth form for the pinion, in embodying the pinion as a cutting tool in reciprocating said tool in the direction of its axis in such manner that the cutting edges move along the teeth of the pinion (which the tool represents), and by providing a feed motion as if said pinion would roll on the gear blank at the predetermined ratio. This method of production is commonly known as the Fellows process.

By providing pinions 14, which mesh simultaneously with external gear 17 and with internal gear 18 an evident simplification and reduction of weight and width is obtained over the embodiment of Fig. 5 and over the known differential gear Fig. 6. In Fig. 1 the width of face of the gears 17, 18 equals the total width of the tooth area. In Fig. 5 said width of face is about one half of the total width of the tooth area, because the gears 17, 18 do not overlap but are shifted apart. In the known differential gear Fig. 6 said width of face is about one third of the total width of the tooth area. This gear, Fig. 6 contains pinion pairs 40, 41 of which the two members 40, 41 intermesh in their area of overlap 42. One member, 40, moreover meshes with external sun gear 43; and the other member, 41, meshes with the external sun gear 44.

When straight teeth are provided, see Fig. 4 it is desirable, that a tooth remains in proper tooth engagement during at least one pitch, that is to say a tooth profile should remain in engagement at least long enough to let the subsequent tooth enter engagement. This requirement limits the tooth number of the pinions which are provided with straight teeth, to about six teeth or more.

The restriction does not exist on helical teeth, as is known, and it is therefore possible to use smaller numbers of teeth on a pinion provided with helical teeth.

A smaller number of teeth permits to provide coarser and stronger teeth, and further permits to provide pinions of smaller diameter and of maximum number. The larger the number of pinions, the smaller will be the load carried by the individual pinions and the smaller can be kept the diameter of the whole differential gear, as well known. For such reasons I preferably provide helical teeth on the pinions 14 and the gears 17 and 18.

Ordinarily helical gears exert a certain end thrust, which must be taken up by especially designed thrust bearings. This fact is a drawback of helical gears as compared with straight tooth gears. In the present case, however, where helical teeth are provided on the gears of a differential, this drawback does not exist, because the gears are ordinarily at rest relatively to each other. Relative motion occurs only occasionally, namely when the vehicle turns a corner and when therefore the two driven members of the differential gear turn at a different rate during that time. Such occasional motion does not necessitate special thrust bearings. The gears may be axially held in the planetary casing in the same way as straight tooth gears, as there is no occasion to create any substantial amount of heat through friction. Helical teeth provided on gears of a differential convey therefore only their advantages, and provide a very smooth action in addition to permitting small numbers of teeth.

In Fig. 7 I have shown a three tooth planetary pinion 14 in mesh with sections of an external sun gear 17 and of an internal orbit gear 18, the pinion and the gears being provided with helical involute teeth. The tooth number of said two gears is the same, and the gear ratio between the pinion and external sun gear 17 is therefore equal to the gear ratio between the pinion and the internal orbit gear 18. The numeral 28 denotes the base circle of the pinion, and 30 denotes the common or joint base circle of the gears 17 and 18. The mesh of the pinion with external gear 17 takes place along an inside tangent to both base circles 28, 30 such as 31; and the mesh with internal gear 18 takes place along an outside tangent such as 32, namely along the part of that tangent which is inside of the common tooth zone. The numerals 35, 36 denote the different pitch circles with which the pinion 14 rolls on the pitch circles 37 and 38 respectively of the two gears 17 and 18. It is again noted that the pressure angles of the double mesh are different, the mesh between pinion and internal gear 18 corresponding to a larger pressure angle. In the case of coarse teeth, recesses 46 following the tooth contours, may be provided on gear 18.

The Figures 8 and 9 refer to an embodiment of the invention, in which the driven members of the differential gear, namely the parts connected with the external sun gear 17 and with the internal orbit gear 18 extend on the same side and transmit torque on the same side of the differential gear proper. The arrangement is further shown in Fig. 10 in a smaller scale.

In this application the structure in accordance with the present invention contains further advantages of simplicity as compared with known differentials, especially the conventional bevel gear differential.

Referring to the Figures 8, 9 and 10, the driving member of the differential is a hollow member 50, which receives power from a motor in any suitable manner. Planetary pinions 14 are mounted on parallel axes on said member 50 and on another member 51, which is rigidly secured to member 50 and which, together with member 50 constitutes a planet carrier. The planets mesh in the manner previously described at the same gear ratio on one side with an external sun gear 17 and on the other side with an internal orbit gear 18. Gear 17 is secured to or is part of a shaft 52, which carries a spiral bevel pinion 53 rigidly secured to shaft 52 adjacent its one end. The other end of shaft 52 extends in the hollow member 50. Two bearings 54, 55 support shaft 52 and the differential. The internal gear 18 is connected with or integral with a spiral bevel pinion 56. The latter meshes with a spiral bevel gear 57, and pinion 53 meshes with a gear 58. The gears 57 and 58 are coaxial and connected for instance with the two wheels respectively of a rear axle. Shaft 52 and hollow member 50 bear on one another at 59. The member constituted by the internal gear 18 and pinion 56 are rotatably held on shaft 52, and further bear with a bushing 60 (Fig. 8) against member 50.

The journals 61 of pinions 14 are preferably made integral with said pinions, which arrangement permits a minimum number of teeth on the pinions. The simplicity of the whole design is evident without further description.

What I claim and desire to secure by Letters Patent is:

1. A differential gear, containing a driving member and two coaxial driven members, said driving member being a planet carrier, planetary pinions mounted in said carrier, said planetary pinions meshing on one side with an external sun gear and on the other side with an internal orbit gear, the sun gear and the orbit gear having equal tooth numbers and constituting the said two driven members.

2. A differential gear, containing a driving member and two coaxial driven members, said driving member being a planet carrier, planetary pinions mounted in said carrier, the same planetary pinions meshing on one side with an external sun gear and on the other side with an internal orbit gear, the double mesh of said pinions corresponding to pitch circles of different diameters on said planetary pinions.

3. In a differential gear, containing a driving member and two coaxial driven members, gears and planetary pinions for transmitting torque from the driving member to said driven members, the same series of teeth of a planetary pinion engaging two gears in a manner corresponding to different pitch circles on said pinion.

4. In a differential gear, containing a driving member and two coaxial driven members, gears and planetary pinions for transmitting torque from the driving member to said driven members, said gears and pinions being disposed on parallel axes and being provided with involute helical teeth, a pinion meshing simultaneously with two gears at different pressure angles.

5. In a differential gear containing a driving member in the form of a planet carrier and two coaxial driven members, planetary pinions mounted in said carrier and provided with helical teeth, an external sun gear and an internal orbit gear forming part of the two driven members respectively, a planetary pinion meshing on one side with said external sun gear and on the other side with said internal orbit gear in a manner corresponding to pitch circles of different diameters on said planetary pinion.

6. In a differential gear, containing a driving member in the form of a planet carrier and two coaxial driven members, planetary pinions mounted in said carrier, said planetary pinions being provided with helical teeth and containing journals integral with said pinions, an external sun gear and an internal orbit gear forming part of the two driven members respectively, a planetary pinion meshing on one side with said external sun gear and on the other side with said internal orbit gear in a manner corresponding to pitch circles of different diameters on said planetary pinion.

ERNEST WILDHABER.